(12) United States Patent
Chu et al.

(10) Patent No.: US 8,843,604 B2
(45) Date of Patent: Sep. 23, 2014

(54) METHOD FOR INTERLOCKING A SERVER TO A SERVER SYSTEM AND A COMPUTER SYSTEM UTILIZING THE SAME

(75) Inventors: Simon C. Chu, Chapel Hill, NC (US);
Richard A. Dayan, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 3663 days.

(21) Appl. No.: 10/465,043

(22) Filed: Jun. 19, 2003

(65) Prior Publication Data

US 2004/0257998 A1 Dec. 23, 2004

(51) Int. Cl.
*G06F 15/173* (2006.01)
*H04L 12/24* (2006.01)

(52) U.S. Cl.
CPC ............... *H04L 41/00* (2013.01); *H04L 12/24* (2013.01)
USPC ....................................................... 709/223

(58) Field of Classification Search
USPC ................. 709/225, 223; 726/2–4, 16, 17
See application file for complete search history.

(56) References Cited

U.S. PATENT DOCUMENTS

| | | | | |
|---|---|---|---|---|
| 5,757,920 A * | 5/1998 | Misra et al. | ................... | 713/158 |
| 6,021,493 A * | 2/2000 | Cromer et al. | ................... | 726/35 |
| 6,233,246 B1 | 5/2001 | Hareski et al. | ................ | 370/422 |
| 6,378,009 B1 | 4/2002 | Pinkston, II et al. | ............ | 710/62 |
| 6,381,641 B1 | 4/2002 | Iwasaki | ........................ | 709/224 |
| 6,427,176 B1 * | 7/2002 | Berglund et al. | ................. | 710/8 |
| 6,460,120 B1 | 10/2002 | Bass et al. | ...................... | 711/148 |
| 6,502,129 B1 | 12/2002 | Stewart et al. | ..................... | 709/222 |
| 6,661,671 B1 * | 12/2003 | Franke et al. | ................. | 361/752 |
| 6,771,499 B2 * | 8/2004 | Crippen et al. | ............... | 361/687 |
| 6,904,482 B2 * | 6/2005 | Rietze et al. | ................... | 710/107 |
| 6,968,414 B2 * | 11/2005 | Abbondanzio et al. | ........ | 710/301 |
| 6,976,112 B2 * | 12/2005 | Franke et al. | ................. | 710/302 |
| 7,034,659 B2 * | 4/2006 | Ungs | ............................ | 340/5.74 |
| 7,051,215 B2 * | 5/2006 | Zimmer et al. | ............... | 713/300 |
| 7,137,014 B2 * | 11/2006 | Dake et al. | .................... | 713/300 |
| 7,191,347 B2 * | 3/2007 | Bigelow et al. | ............... | 713/300 |
| 7,194,619 B2 * | 3/2007 | Abbondanzio et al. | ........ | 713/155 |
| 7,308,703 B2 * | 12/2007 | Wright et al. | ..................... | 726/1 |
| 7,627,901 B1 * | 12/2009 | Elliott | ............................ | 726/26 |
| 2002/0064149 A1 * | 5/2002 | Elliott et al. | ................... | 370/352 |
| 2002/0095487 A1 * | 7/2002 | Day et al. | ....................... | 709/223 |
| 2002/0104009 A1 * | 8/2002 | Zodnik | .......................... | 713/200 |
| 2002/0198992 A1 * | 12/2002 | Stutz et al. | ..................... | 709/225 |
| 2003/0048613 A1 | 3/2003 | Garnett et al. | ................. | 361/724 |
| 2003/0065751 A1 | 4/2003 | Autor et al. | ..................... | 709/220 |
| 2003/0069953 A1 * | 4/2003 | Bottom et al. | ................ | 709/223 |
| 2003/0105904 A1 * | 6/2003 | Abbondanzio et al. | ........ | 710/302 |
| 2003/0181229 A1 * | 9/2003 | Forster et al. | ............... | 455/575.7 |
| 2003/0188176 A1 * | 10/2003 | Abbondanzio et al. | ........ | 713/191 |
| 2004/0100765 A1 * | 5/2004 | Crippen et al. | ............... | 361/687 |
| 2004/0103327 A1 * | 5/2004 | Dake et al. | ..................... | 713/300 |
| 2004/0109406 A1 * | 6/2004 | Rothman et al. | .............. | 370/216 |
| 2004/0117536 A1 * | 6/2004 | Franke et al. | ................. | 710/302 |
| 2004/0128562 A1 * | 7/2004 | Bigelow et al. | ............... | 713/300 |

(Continued)

*Primary Examiner* — Christopher Biagini
(74) *Attorney, Agent, or Firm* — Edward J. Lenart; Katherine S. Brown; Biggers Kennedy Lenart Spraggins LLP

(57) ABSTRACT

A method for interlocking a plurality of servers to a server system is disclosed. The method comprises assigning an identifier to each of the plurality of servers, wherein the identifier associates each of the plurality of servers to the server system, thereby defining a plurality of interlocked servers.

64 Claims, 5 Drawing Sheets

(56) References Cited

U.S. PATENT DOCUMENTS

2004/0165358 A1* 8/2004 Regimbal et al. ............. 361/727
2004/0233636 A1* 11/2004 Crippen et al. ............... 361/700
2004/0240180 A1* 12/2004 Crippen et al. ............... 361/700

* cited by examiner

METHOD FOR INTERLOCKING A SERVER TO A SERVER SYSTEM AND A COMPUTER SYSTEM UTILIZING THE SAME

FIELD OF THE INVENTION

The present invention relates generally to computer server systems and, more particularly, to a method for interlocking a server to a server system.

BACKGROUND OF THE INVENTION

In today's environment, a computing system often includes several components, such as servers, hard drives, and other peripheral devices. These components are generally stored in racks. For a large company, the storage racks can number in the hundreds and occupy huge amounts of floor space. Also, because the components are generally free standing components, i.e., they are not integrated, resources such as floppy drives, keyboards and monitors, cannot be shared.

A system has been developed by International Business Machines Corp. of Armonk, N.Y., that bundles the computing system described above into a compact operational unit. The system is known as an IBM eServer BladeCenter.™ The BladeCenter is a 7U modular chassis that is capable of housing up to 14 individual server blades. A server blade or blade is a computer component that provides the processor, memory, hard disk storage and firmware of an industry standard server. Each blade can be "hot-plugged" into a slot in the chassis. The chassis also houses supporting resources such as power, switch, management and blower modules. Thus, the chassis allows the individual blades to share the supporting resources.

In a dense server environment, multiple BladeCenter type products can be utilized. Because the server blades are highly mobile, i.e., they are easily removed from a chassis and easily reinstalled into the same or another chassis, there is a possibility that an unauthorized or hostile server blade can be placed in a chassis. In that case, the hostile server blade could have access to information on the other server blades in the chassis or be privy to information distributed to the authorized server blades in the chassis. Moreover, the hostile server blade could corrupt the other server blades, e.g., by introducing viruses into the system. Clearly, this raises serious security concerns.

Accordingly, a need exists for a method for securely interlocking servers to their respective server systems. The method should be able to detect and isolate a non-interlocked, i.e., unauthorized, server in the server system. The present invention addresses such a need.

SUMMARY OF THE INVENTION

The present invention is directed to a method for interlocking a plurality of servers to a server system and a computer system utilizing the same. In a first aspect, the method comprises assigning an identifier to each of the plurality of servers, wherein the identifier associates each of the plurality of servers to the server system, thereby defining a plurality of interlocked servers.

Through the aspects of the present invention, each server is interlocked to its respective server system via an identifier stored in its non-volatile storage. The identifier is unique to the server system. Thus, if an unauthorized server is placed in the server system, it will be identified immediately as such and isolated from the other servers in the system. In this manner, the server system is protected from intruders.

DETAILED DESCRIPTION

The present invention relates generally to computer server systems and, more particularly, to a method and system for interlocking a server to a server system. The following description is presented to enable one of ordinary skill in the art to make and use the invention and is provided in the context of a patent application and its requirements. Although the preferred embodiment of the present invention will be described in the context of a BladeCenter, various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

According to a preferred embodiment of the present invention, an interlock mechanism allows an administrator to interlock each server in a server system (chassis) to the system by storing an identifier in each server's non-volatile storage. The identifier uniquely identifies the server system. Thus, at appropriate times, the interlock mechanism will autonomously check each server in the system to ensure that each server is interlocked to the server system. If an unauthorized server is detected, the interlock mechanism will take appropriate action to protect the server system from the unauthorized server.

Figure 1:
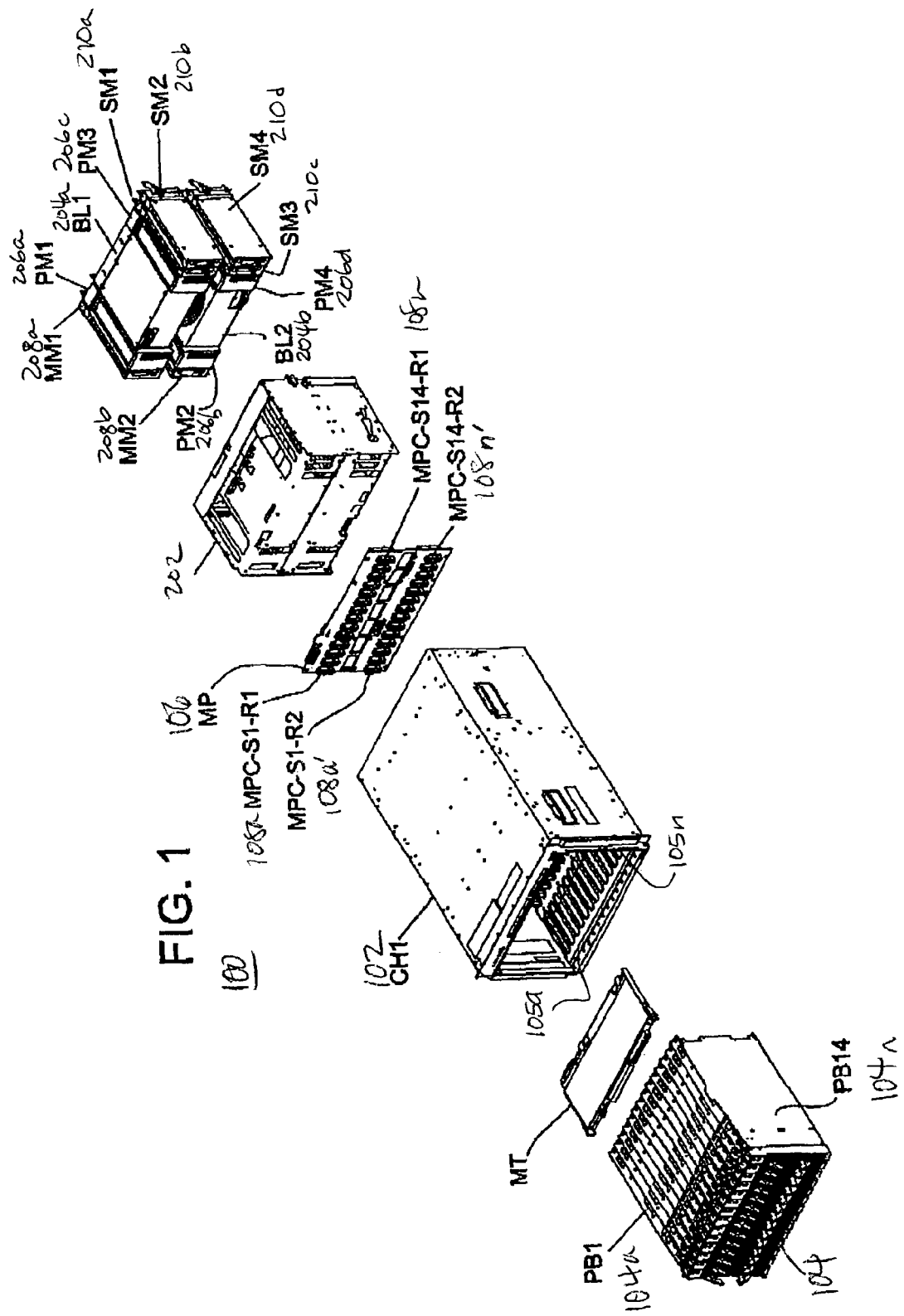
FIG. 1 is a perspective view illustrating the front portion of a BladeCenter.

To describe the features of the present invention, please refer to the following discussion and Figures, which describe a computer system, such as the BladeCenter, that can be utilized with the present invention. FIG. 1 is an exploded perspective view of the BladeCenter system 100. Referring to this figure, a main chassis 102 houses all the components of the system. Up to 14 server blades 104 (or other blades, such as storage blades) are optionally hot plugable into 14 corresponding slots 105a-105n in the front of chassis 102. Blades 104 may be "hot swapped" without affecting the operation of other blades 104 in the system 100. A server blade 104a can use any microprocessor technology so long as it is compliant with the mechanical and electrical interfaces, and the power and cooling requirements of the system 100.

A midplane circuit board 106 is positioned approximately in the middle of chassis 102 and includes two rows of connectors 108, 108'. Each one of the 14 slots includes one pair of midplane connectors, e.g., 108a, 108a', located one above the other, and each pair of midplane connectors, e.g., 108a, 108a' mates to a pair of connectors (not shown) at the rear edge of each server blade, e.g., 104a.

Figure 2:
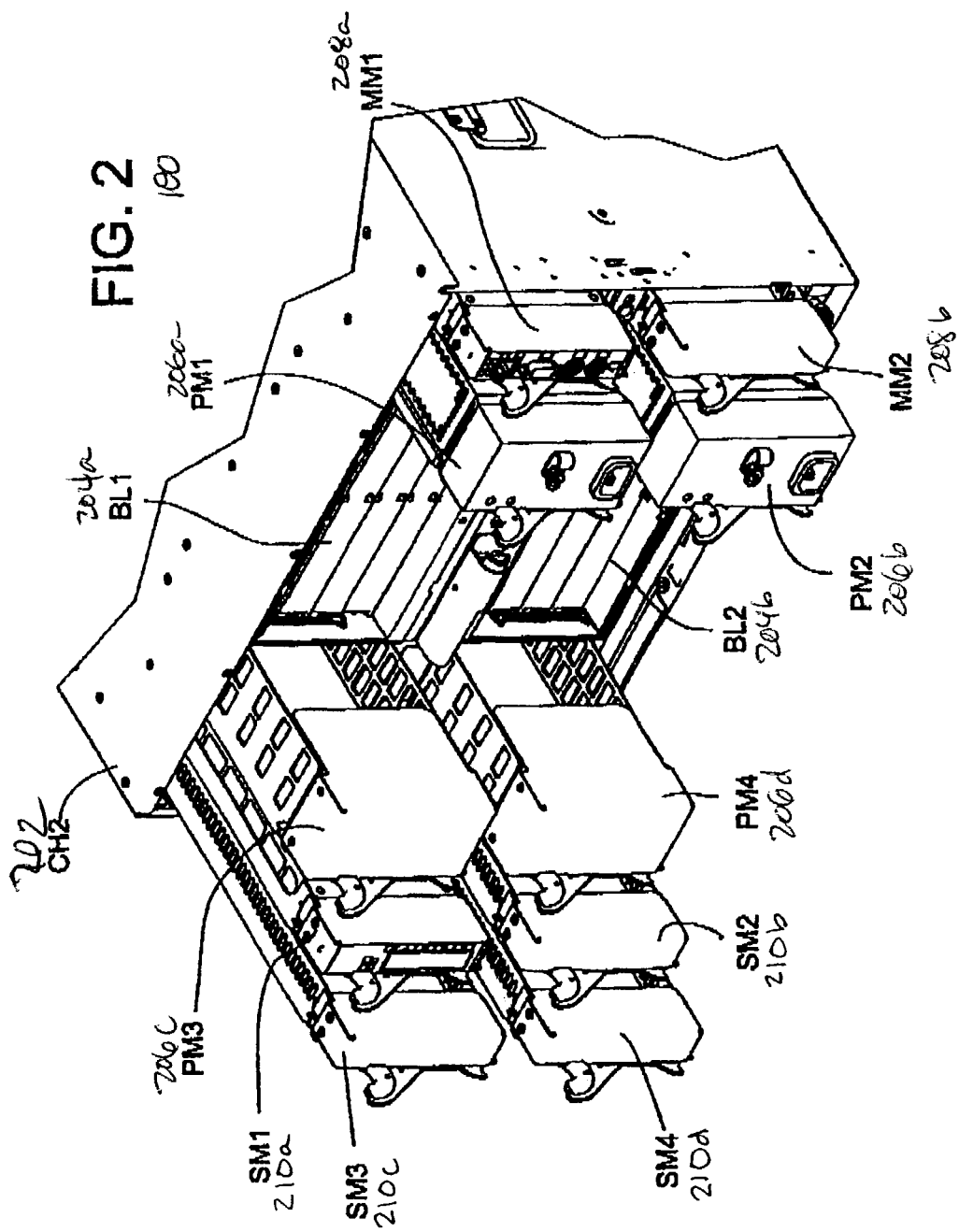
FIG. 2 is a perspective view of the rear portion of the BladeCenter.

FIG. 2 is a perspective view of the rear portion of the BladeCenter system 100, whereby similar components are identified with similar reference numerals. Referring to FIGS. 1 and 2, a second chassis 202 also houses various components for cooling, power, management and switching. The second chassis 202 slides and latches into the rear of main chassis 102.

As is shown in FIGS. 1 and 2, two optionally hot plugable blowers 204a, 204b provide cooling to the blade system components. Four optionally hot plugable power modules 206 provide power for the server blades and other components. Management modules MM1 and MM2 (208a, 208b) provide basic management functions such as controlling, monitoring, alerting, restarting and diagnostics. Management modules 208 also provide other functions required to manage shared resources, such as multiplexing the keyboard/video/mouse (KVM) to provide a local console for the individual blade servers 104 and configuring the system 100 and switching modules 210.

The management modules 208 communicate with all of the key components of the system 100 including the switch 210, power 206, and blower 204 modules as well as the blade servers 104 themselves. The management modules 208 detect the presence, absence, and condition of each of these components. When two management modules are installed, a first module, e.g., MM1 (208a), will assume the active management role, while the second module MM2 (208b) will serve as a standby module.

The second chassis 202 also houses up to four switching modules SM1 through SM4 (210a-210d). Each switch module includes several external data ports (not shown) for connection to the external network infrastructure. The primary purpose of the switch module 210 is to provide interconnectivity between the server blades (104a-104n), management modules (208a, 208b) and the outside network infrastructure.

Figure 3:
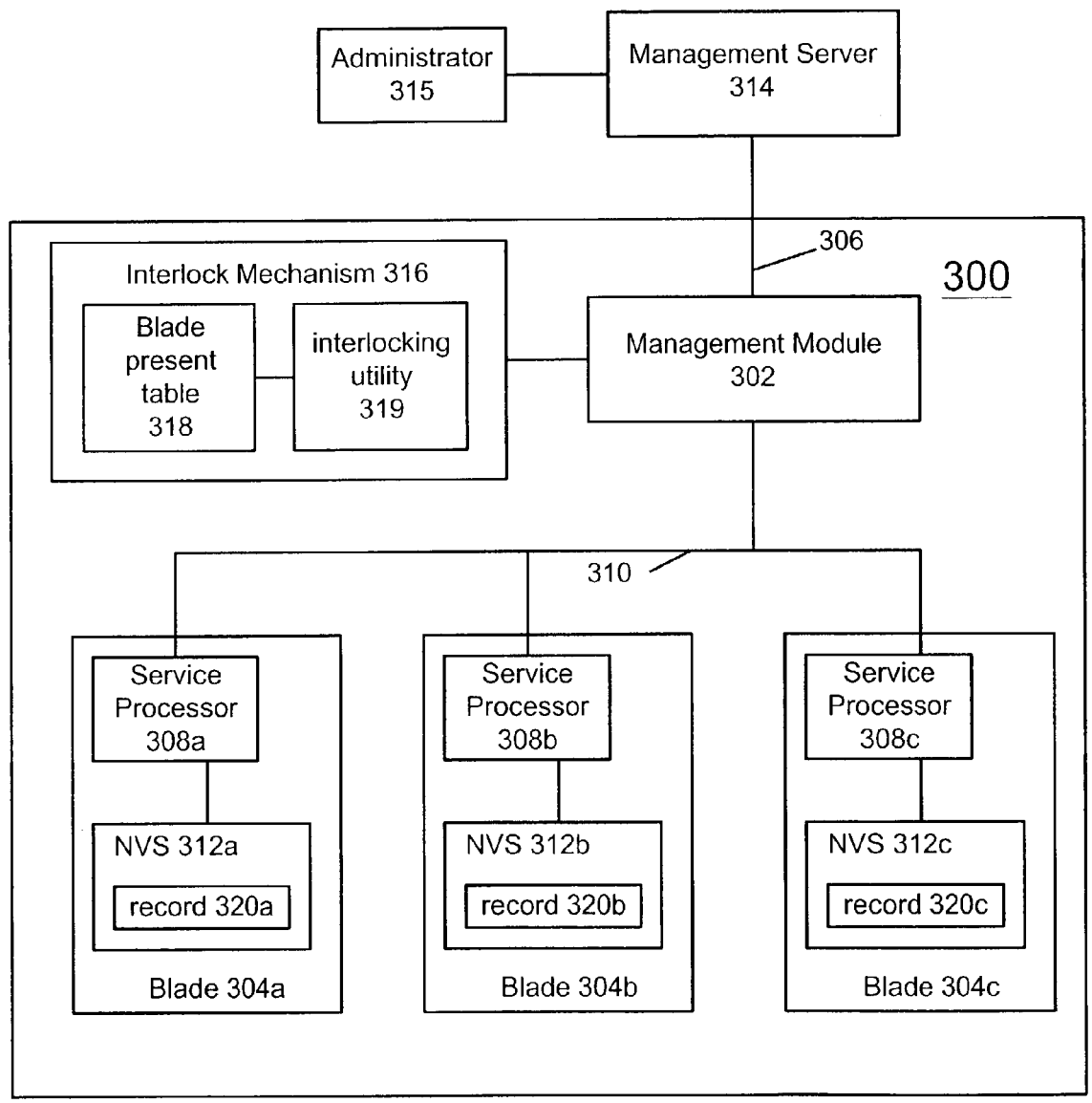
FIG. 3 is a schematic block diagram of a server blade system according to a preferred embodiment of the present invention.

FIG. 3 is a schematic block diagram of a server blade system 300 according to a preferred embodiment of the present invention. For the sake of clarity only, one management module 302 and three server blades (304a-304c) are illustrated. Referring to this figure, the management module 302 is coupled to the server blades (304a-304c) via at least one serial bus (310) for "out-of-band" communication between the management module (302) and the server blades (304a-304c). "Out-of-band" communications refer to secure internal communications between components in the server system. These communications are not accessible by external entities.

As is shown in FIG. 3, the management module 302 communicates with each server blade 304a-304c through a dedicated service processor 308a-308c in each server blade 304a-304c. The management module 302 also includes a port 306 that is intended to be attached to a private, secure management server 314. The management module 302 can send alerts to the management server 314 to indicate changes in status, such as removal or addition of a blade 304a-304c or module.

In general, the management module 302 can detect the presence, quantity, type, and revision level of each blade 304a-304c, power module 206, blower 204, and midplane 106 in the system, and can detect invalid or unsupported configurations. The management module 302 will retrieve and monitor critical information about the chassis 102 and server blades 304a-304c, such as temperature, voltages, power supply, memory, fan and hard drive status. If a problem is detected, the management module 302 can transmit a warning to a system administrator 315 via the port 306 coupled to the management server 314.

Referring again to FIG. 1, up to 14 server blades 104a-104n can be hot-plugged into corresponding slots 105a-105n in the chassis 102 of a BladeCenter type server system 100. Therefore, one advantage of the BladeCenter server system 100 is that server blades 104a-104n can be easily removed from and installed into the chassis 102. Nevertheless if multiple server systems, i.e. more than one chassis, are utilized, keeping track of which chassis 102 a server blade, e.g., 104a, is associated with can become problematic if the server blade 104a is removed from its chassis 102. Moreover, serious security concerns are presented because an unauthorized server blade, e.g., 104n, can easily be placed in the chassis 102. The unauthorized server blade 104n could then have access to the other server blades 104a-104m in the chassis 102. The present invention addresses these issues.

Referring again to FIG. 3, an interlock mechanism 316 is coupled to each of the blades 304a-304c via the management module 302. In this embodiment, the interlock mechanism 316 utilizes the "out-of-band" serial bus 310 to communicate with each of the blades 304a-304c through each blade's dedicated service processor 308a-308c. In another embodiment, the interlock mechanism 316 could be a stand alone module coupled to the service processors 308a-308c. The interlock mechanism 316 includes a Blade Present Table 318, which includes information about which server blade, e.g., 304a, occupies which slot 105a (FIG. 1) in the chassis 102. The interlock mechanism 316 also includes an interlocking utility 319, which provides an interface between the system administrator 315 and the interlock mechanism 316.

In a preferred embodiment of the present invention, the system administrator (or some other authorized entity) (315) invokes the interlock utility 319 via the management server 314 to interlock the server blades 304a-304c to the server system 300. As used in this description, "interlocking" a server blade, e.g., 304a, refers to associating the server blade 304a to an entity, such as the server system 300 or chassis 102. In an initializing session, the interlock mechanism 316 assigns to each server blade 304a-304c an identifier, hereinafter referred to as an interlock record 320a-320c, that uniquely identifies the server system 300.

Each server blade 304a-304c includes non-volatile storage (NVS) 312a-312c, which is accessible by the associated service processor 308a-308c. The NVS 312a-312c can be any storage medium known in the art, such as storage on a hard file partition or non-volatile memory (CMOS). The interlock record 320a-320c is stored in each blade's NVS 312a-312c as well as in the Blade Present Table 318. Thus, at appropriate times, the interlock mechanism 316 will autonomously check each server blade 304a-304c in the system 300 to ensure that each server blade 304a-304c is interlocked to the server system 300. If an unauthorized server blade, e.g., 304b is detected, the interlock mechanism 316 will take appropriate action to protect the server system 300 from the unauthorized server blade 304b.

Figure 4:
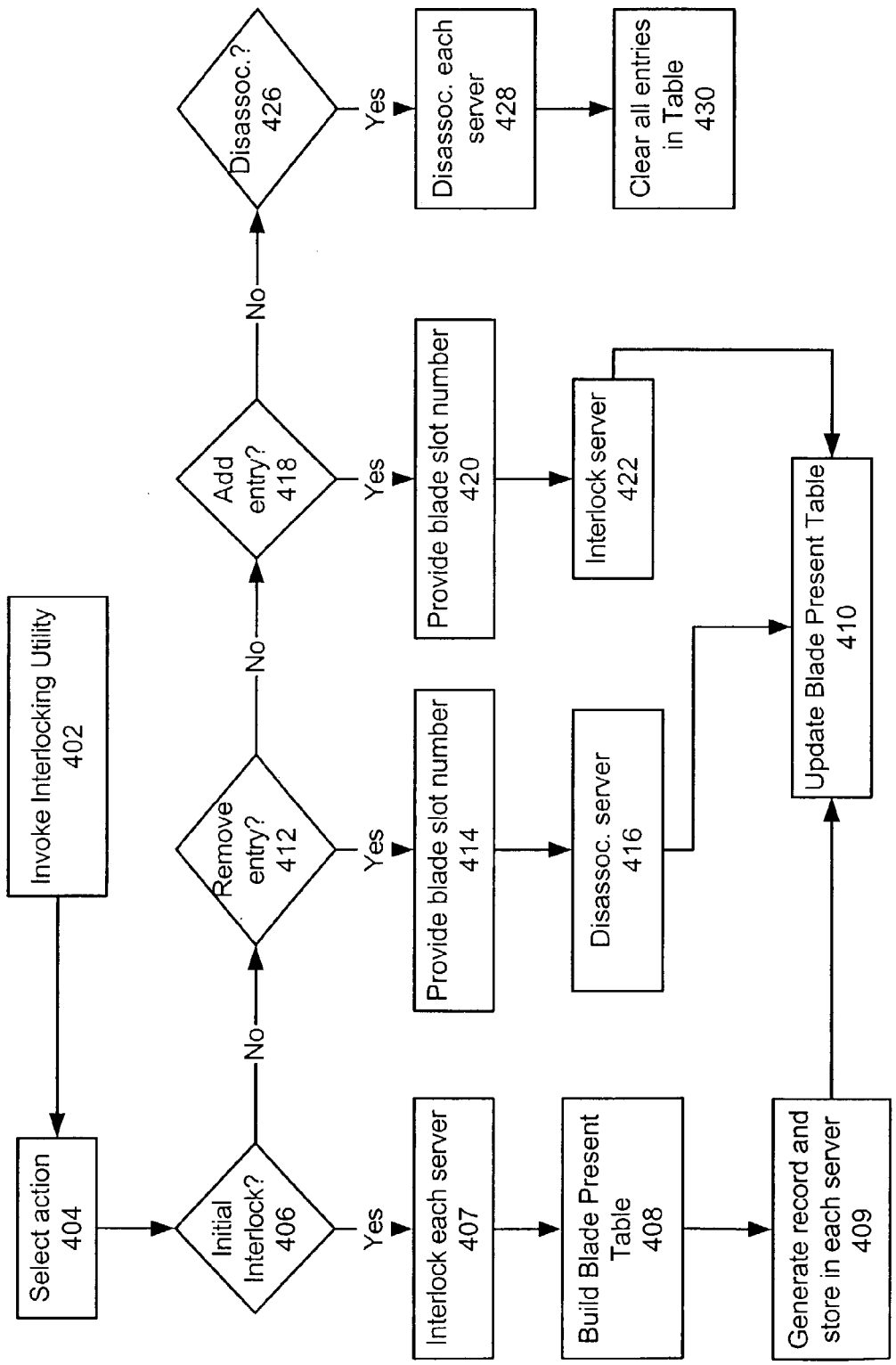
FIG. 4 is a flowchart illustrating a process by which a system administrator uses the interlock utility in accordance with a preferred embodiment of the present invention.

FIG. 4 is a flowchart illustrating a process by which a system administrator 315 uses the interlocking utility 319 in accordance with a preferred embodiment of the present invention. As is shown, the interlocking utility 319 allows the system administrator 315 to perform interlocking actions such as interlocking, removing, adding and disassociating one or more server blades from the server blade system. The process begins when the administrator 315 invokes the interlocking utility 319 in step 402. In a preferred embodiment, the interlocking utility 319 is password protected to restrict access only to authorized personnel. After the administrator has entered a valid password, the administrator 315 selects the type of action he or she would like to perform in step 404.

If none of the server blades 304a-304c are interlocked to the server system 300, the administrator can select an initial interlocking session (in step 406). In step 407, the interlock mechanism 316 interlocks each server blade 304a-304c to the server system 300. In a preferred embodiment, the interlocking process begins by building the Blade Present Table 318 (step 408) so that the table 318 includes an entry for each server blade 304a-304c present in the system 300. The interlock mechanism 316 then generates the interlock record 320 and stores the interlock record 320 in each server blade's non-volatile storage 312a-312c in step 409. In a preferred embodiment, the interlock mechanism 316 transfers the interlock record 320 to each server blade's non-volatile storage 312a-312c in the form of an enumeration, such as an ACPI enumeration. After each server blade 304a-304c has been interlocked, the interlocking utility 319 updates the Blade Present Table 318.

In one preferred embodiment, the interlock record 320a-320c is some alphanumeric string that uniquely identifies the server system 300. For example, the record 320a for a server blade 304a could include the serial number for the management module 302, the server blade's 304a serial number, and the date and time of the session. Moreover, if the server system 300 includes a second management module (not shown), e.g., a backup module, the record 320a-320c could also include the serial number of the second management module. Accordingly, if the second module is activated, the server blades 304a-304c remain automatically interlocked to the server system 300. In this case, the Blade Present Table 318 is copied to the second management module.

If the initial interlocking session has been completed, the administrator 315 can choose to remove an entry in the Blade Present Table 318 (step 412). The administrator 315 might perform this action if he or she were removing one of the interlocked server blades, e.g., 304b, from the server system 300. Here, in step 414, the administrator 315 provides a slot number representing the slot (e.g., 105b) from which the server blade 304b will be removed. The interlock mechanism 316 then disassociates the server blade 304b from the server system 300 in step 416 by erasing the interlock record 320b stored in the server's non-volatile storage 312b. In step 410, the interlock mechanism 316 removes the corresponding entry in the Blade Present Table.

If the administrator wishes to add an entry (step 418), i.e., add a new server blade (304c) into the server system 300, the administrator 315 provides the slot number representing the slot (e.g., 105b) into which the server blade 304c will be placed via step 420. The interlock mechanism 316 then interlocks the server blade 304c to the server system 300 in step 422 by generating the interlock record 320c and storing it in the server's non-volatile storage 312c. In step 410, the interlock mechanism 316 adds the corresponding entry in the Blade Present Table.

If the administrator would like to disassociate each server blade 304a-304c from the server system 300 (step 426), the interlock mechanism 316 disassociates each server blade in step 428 by erasing each interlock record 320a-320c in each server blade's non-volatile storage 312a-312c. In step 430, all entries in the Blade Present Table 318 are cleared.

Once the administrator 315 has interlocked the server blades 304a-304c to the server system 300, the interlock mechanism 316 can detect automatically the presence of a server blade that has not been authorized, i.e., interlocked, by the administrator 315. As stated above, the interlock mechanism 316 checks each server blade 304a-304c in the system 300 to ensure that each server blade 304a-304c is interlocked to the server system 300. Preferably, the interlock mechanism 316 checks each server blade 304a-304c during a power-up sequence for the server system 300, and investigates if a server blade has been added to or removed from the server system 300.

Figure 5:
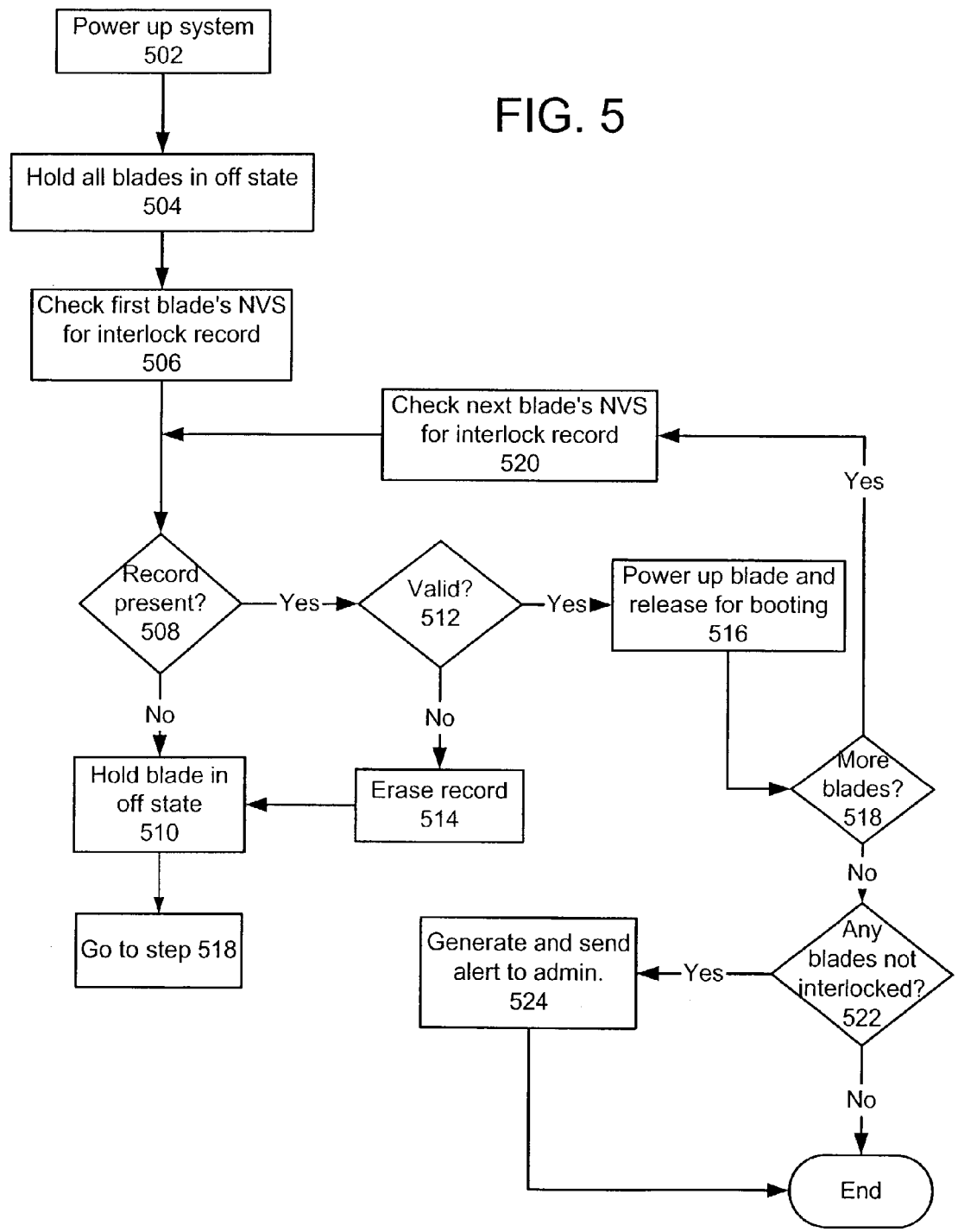
FIG. 5 is a flowchart illustrating the process by which the server system performs a power-up sequence according to a preferred embodiment of the present invention.

FIG. 5 is a flowchart illustrating the process by which the server system 300 performs a power-up sequence according to a preferred embodiment of the present invention. The process starts at the initial power up or reset sequence of the server system 300, i.e., when the management module 302 is powered up (via step 502) or reset. The interlock mechanism 316 instructs the management module 302 to hold all of the blades 304a-304c in a powered off state (step 504). In step 506, the interlock mechanism 316 checks a first blade's, e.g., 304a, non-volatile storage 312a to determine whether it has an existing interlock record 320a (step 508). If the interlock mechanism 316 fails to find an interlock record 320a in the first server blade 304a, e.g., because the server blade 304a was placed in the server system 300 during a power-off state, then the interlock mechanism 316 instructs the management module 302 to maintain the power off state for that server blade 304a in step 510. If more server blades need to be checked (step 518), then the interlock mechanism 316 continues by checking the next server blade's non-volatile storage 312b for an interlock record 320b via step 520.

If the interlock mechanism 316 finds an existing interlock record 320b (step 508) in the server blade's non-volatile storage 312b, the interlock mechanism 316 must determine whether the interlock record 320b is valid, i.e., not generated by another interlock mechanism, in step 512. In one preferred embodiment, the interlock mechanism 316 will access the Blade Present Table 318 and compare the existing interlock record 320b to that stored in the table 318. If the values do not match, i.e., the interlock record 320b is invalid, the interlock mechanism 316 erases the existing interlock record 320b in step 514 and instructs the management module 302 to maintain the power off state for that server blade 304b in step 510. If the values do match, i.e., the interlock record 320b is valid, the interlock mechanism 316 instructs the management module 302 to power up the server blade 304b and to release it for booting in step 516. In either case, the next step (step 518) involves determining whether the interlock mechanism 316 must check more blades. If there are more, steps 508-520 are repeated.

After the interlock mechanism 316 has checked each of the server blades 304a-304c in the server system 300 (step 518), it determines which, if any, of the server blades 304a-304c are not interlocked in step 522. The server blades, e.g., 304a, that are held in the power-off state are not interlocked to the server system 300. If there are any server blades that are not interlocked, the interlock mechanism 316 generates an alert and transmits it to the system administrator via the management server 314, in step 524. In a preferred embodiment, the alert includes the slot number into which the non-interlocked server blade(s) 304a is placed.

As stated above, a non-interlocked server blade, e.g., 304a, is not authorized to operate in the server system 300. By holding the non-interlocked server blade 304a in a power-off state, the interlock mechanism 316 isolates the non-interlocked server blade 304a from the interlocked server blades, e.g., 304b, 304c. In another embodiment, the interlock mechanism 316 instructs the management module 302 to power off the entire server system 300 after transmitting the alert if any of the server blades 304a-304c are not interlocked to the server system 300. In either embodiment, the interlock mechanism 316 protects the integrity of the server system 300 from any unauthorized, i.e., non-interlocked, server blades 304a coupled to the system 300.

As mentioned above, the management module 302 and therefore the interlock mechanism 316 are sensitive to the addition or removal of a server blade to and from the server system 300. In both instances, the interlock mechanism 31 6 ensures that the server system 300 is protected and that the administrator 315 is alerted of any potential security breach.

For instance, in a preferred embodiment, if the management module 302 detects that a blade server, e.g., 304c, is inserted into the server system 300, the interlock mechanism 316 will instruct the management module 302 to hold the newly inserted blade server 304c in a power off state, while it checks the server blade 304c to determine whether it is interlocked to the server system 300 (process steps 506-516 in FIG. 5). If the server blade is not interlocked, the interlock mechanism 316 instructs the management module 302 to maintain the power off state, and generates the alert indicating the slot number of the non-interlocked server blade 304c. The interlock mechanism 316 then transmits the alert to the administrator 315.

If the management module 302 detects that a server blade, e.g., 304b, has been removed or powered off, the interlock mechanism 316 marks the entry in the Blade Present Table 318 corresponding to the removed server blade 304b and generates the alert indicating the slot number of the removed server blade 304b. The interlock mechanism 316 then transmits the alert to the administrator 315. If the removed server blade 304b is reinserted into the slot, the management module 302 detects that a server blade 304b is inserted into the server system 300, and the interlock mechanism 316 instructs the management module 302 to hold the reinserted server blade 304b in a power off state, while it checks the server blade 304b to determine whether it is interlocked to the server system 300 (process steps 506-514 in FIG. 5). In this case, the interlock mechanism 316 notes the mark in the entry in the Blade Present Table 318 when it compares the identifiers. The interlock mechanism 316 instructs the management module 302 to maintain the power off state, and generates another alert indicating the slot number of the suspect server blade 304b. The interlock mechanism 316 then transmits this alert to the administrator 315.

The interlock mechanism 316 generates and transmits the alert to the administrator 315 only if a non-interlocked server blade has been detected or if a server blade has been removed, or if a removed server blade has been reinserted. In either case, the administrator 315 utilizes the alert to manage and maintain the server system 300. For example, referring again to FIG. 4, if a server blade has been removed, the administrator receives an alert indicating the slot number of the removed server blade. After the administrator authorizes the removal, the administrator invokes the interlock utility (step 402) and selects the action of removing an entry (step 412). The administrator provides the slot number indicated in the alert (step 414) and the interlock mechanism 316 disassociates the server blade from the server system 300. Similarly, if a non-interlocked server blade has been detected, the administrator receives an alert indicating the slot number of the non-interlocked server blade. After the administrator authorizes the server blade, the administrator invokes the interlock utility (step 402) and selects the "add an entry" action (step 418). The administrator provides the slot number indicated in the alert (step 420) and the interlock mechanism 316 interlocks the server blade to the server system 300.

As stated above, the process of interlocking a server, e.g., 304c, to the server system 300 involves generating an interlock record 320c and storing it in the server's non-volatile storage 312c. The interlock record 320c is preferably based on any combination of the serial number for the management module 302, the server blade's 304c serial number, and the date and time of the session. For added security, the interlock mechanism 316 preferably utilizes a hashing algorithm to hash the interlock record 320c to form a nonce. The nonce is then stored in the Blade Present Table 318. When the interlock mechanism 316 stores the nonce in the server blade's non-volatile storage 312c, it instructs the server blade 304c to encrypt the nonce using the server blade's private key. Accordingly, the server blade 304c stores the encrypted nonce in its non-volatile storage 312c.

When the interlock mechanism 316 attempts to validate the interlock record 320c in the server blade 304c, e.g., during a system power up sequence, the interlock mechanism 316 obtains the server blade's public key via the "out-of-band" serial bus 310. The interlock mechanism 316 uses the public key to decrypt the encrypted nonce and compares the nonce in the server blade 304c with that stored in the Blade Present Table 318.

By creating a nonce to represent the interlock record 320 and then encrypting the nonce at the server blade, the interlock mechanism 316 adds several layers of security to the interlocking configuration of the server system 300. Thus, unauthorized access to the server system 300 is further deterred.

Through aspects of the present invention, the interlock mechanism 316 allows an administrator 315 to interlock each server in a server system to the system by storing an interlock record in each server's non-volatile storage. The interlock record uniquely identifies the server system. Thus, at appropriate times, the interlock mechanism will autonomously check each server in the server system to ensure that each server is interlocked. If an unauthorized server is detected, the interlock mechanism will take appropriate action to protect the server system from the unauthorized server.

While the preferred embodiment of the present invention has been described in the context of a BladeCenter environment, the functionality of the interlock mechanism 316 could be implemented in any computer environment where the servers are closely coupled. Thus, although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for interlocking a plurality of servers to a server system comprising:
  a) assigning an identifier to each of the plurality of servers, wherein the identifier uniquely identifies the server system and associates each of the plurality of servers to the server system; and, at a time after the assignment of the identifier, autonomously checking a number of servers installed in the server system to ensure that each of the number of installed servers is interlocked to the server system and to protect the server system from an unauthorized server.

2. The method of claim 1, wherein each of the plurality of interlocked servers includes non-volatile storage.

3. The method of claim 2 further comprising:
  b) storing the identifier in each interlocked server's non-volatile storage.

4. The method of claim 3, wherein the assigning step (a) further comprises:
  (a1) generating the identifier; and
  (a2) storing the identifier in a table.

5. The method of claim 4 further comprising:
(c) adding a server to the plurality of interlocked servers.

6. The method of claim 5, wherein the adding step (c) further comprises:
(c1) providing a slot number into which the server will be placed;
(c2) assigning the identifier to the server and storing the identifier in the Server's non-volatile storage; and
(c3) updating the table to include the server in the plurality of interlocked Servers.

7. The method of claim 4 further comprising:
(c) removing a server from the plurality of interlocked servers.

8. The method of claim 7, wherein the removing step (c) further comprises:
(c1) providing the slot number from which the server will be removed;
(c2) erasing the identifier from the server's non-volatile storage; and
(c3) updating the table to exclude the server from the plurality of interlocked servers.

9. The method of claim 4 further comprising:
(c) sensing a removal of one of the plurality of interlocked servers;
(d) marking the identifier in the table corresponding to the removed server; and
(e) protecting the server system.

10. The method of claim 9, wherein the protecting step (e) further comprises:
(e1) notifying a system administrator that the server has been removed; and
(e2) isolating the removed server from the plurality of interlocked servers if the removed server is reinserted into the system.

11. The method of claim 10, wherein the isolating step (e2) further comprises:
(e2i) comparing the removed server's identifier with the identifier stored in the table when the system senses that the removed server has been reinserted into the system; and
(e2ii) holding the removed server in a power-off state if the identifier stored in the table is marked.

12. The method of claim 4 further comprising:
(c) detecting a server that is not interlocked to the server system by examining the server's non-volatile storage, wherein a non-interlocked server is not authorized to run in the server system.

13. The method of claim 12, wherein the detecting step (c) further comprises:
(c1) concluding the server is not interlocked if the non-volatile storage does not include an identifier, else
(c2) determining whether an existing identifier is valid if an identifier is found in the non-volatile storage; and
(c3) concluding that the server is not interlocked if the existing identifier is invalid.

14. The method of claim 13, wherein the determining step (c2) further comprises:
(c2i) comparing the existing identifier to the identifier stored in the table; and
(c2ii) concluding the existing identifier is invalid if the existing identifier does not match the stored identifier.

15. The method of claim 14, wherein the storing step (b) further comprises:
(b1) encrypting the identifier with a private key for each interlocked server; and
(b2) storing the encrypted identifier in each interlocked server's non-volatile storage.

16. The method of claim 15, wherein the determining step (c2) further comprises:
(c2iii) decrypting the existing identifier with a public key for the server.

17. The method of claim 12 further comprising:
d) protecting the server system from the non-interlocked server.

18. The method of claim 17, wherein the protecting step (d) further comprises:
(d1) isolating the server from the plurality of interlocked servers; and
(d2) notifying a system administrator that the server is not interlocked to the server system.

19. The method of claim 18, wherein the isolating step (d1) further comprises:
(d1i) holding the server in a power-off state.

20. The method of claim 18, wherein the isolating step (d1) further comprises:
(d1i) powering-down the server system.

21. The method of claim 12, wherein the detecting step (c) is performed during a power-up sequence for the server system.

22. The method of claim 12, wherein the detecting step (c) is performed if the server system senses that a new server has been placed into the system.

23. A computer readable recordable medium containing program instructions for interlocking a plurality of servers to a server system the instructions for:
a) assigning an identifier to each of the plurality of servers, wherein the identifier uniquely identifies the server system and associates each of the plurality of servers to the server system; and, at a time after the assignment of the identifier, autonomously checking a number of servers installed in the server system to ensure that each of the number of installed server is interlocked to the server system and to protect the server system from an unauthorized server.

24. The computer readable medium of claim 23, wherein each of the plurality of interlocked servers includes non-volatile storage.

25. The computer readable medium of claim 24 further comprising:
b) storing the identifier in each interlocked server's non-volatile storage.

26. The computer readable medium of claim 25, wherein the assigning instruction (a) further comprises:
(a1) generating the identifier; and
(a2) storing the identifier in a table.

27. The computer readable medium of claim 26 further comprising instruction for:
(c) adding a server to the plurality of interlocked servers.

28. The computer readable medium of claim 27, wherein the adding instruction (c) further comprises:
(c1) providing a slot number into which the server will be placed;
(c2) assigning the identifier to the server and storing the identifier in the server's non-volatile storage; and
(c3) updating the table to include the server in the plurality of interlocked servers.

29. The computer readable medium of claim 26 further comprising instruction for:
(c) removing a server from the plurality of interlocked servers.

30. The computer readable medium of claim 29, wherein the removing instruction (c) further comprises:
(c1) providing the slot number from which the server will be removed;

(c2) erasing the identifier from the server's non-volatile storage; and (c3) updating the table to exclude the server from the plurality of interlocked servers.

31. The computer readable medium of claim 26 further comprises:

(c) sensing a removal of one of the plurality of interlocked servers;

(d) marking the identifier in the table corresponding to the removed server; and (e) protecting the server system.

32. The computer readable medium of claim 31, wherein the protecting instruction (e) further comprises:

(e1) notifying a system administrator that the server has been removed; and (e2) isolating the removed server from the plurality of interlocked servers if the removed server is reinserted into the system.

33. The computer readable medium of claim 32, wherein the isolating step (e2) further comprises:

(e2i) comparing the removed server's identifier with the identifier stored in the table when the system senses that the removed server has been reinserted into the system; and (e2ii) holding the removed server in a power-off state if the identifier stored in the table is marked.

34. The computer readable medium of claim 26 further comprising the instruction for:

c) detecting a server that is not interlocked to the server system by examining the server's non-volatile storage, wherein a non-interlocked server is not authorized to run in the server system.

35. The computer readable medium of claim 34, wherein the detecting instruction (c) further comprises:

(c1) concluding the server is not interlocked if the non-volatile storage does not include an identifier; else (c2) determining whether an existing identifier is valid if an identifier is found in the non-volatile storage; and (c3) concluding that the server is not interlocked if the existing identifier is invalid.

36. The computer readable medium of claim 35, wherein the determining instruction (c2) further comprises:

(c2i) comparing the existing identifier to the identifier stored in the table; and (c2ii) concluding the existing identifier is invalid if the existing identifier does not match the stored identifier.

37. The computer readable medium of claim 36, wherein the storing instruction (b) further comprises:

(b1) encrypting the identifier with a private key for each interlocked server; and (b2) storing the encrypted identifier in each interlocked server's non-volatile storage.

38. The computer readable medium of claim 37, wherein the determining instruction (c2) further comprises:

(c2iii) decrypting the existing identifier with a public key for the server.

39. The computer readable medium of claim 34 further comprises:

d) protecting the server system from the non-interlocked server.

40. The computer readable medium of claim 39, wherein the protecting instruction (d) further comprises:

(d1) isolating the server from the plurality of interlocked servers; and (d2) notifying a system administrator that the server is not interlocked to the server system.

41. The computer readable medium of claim 40, wherein the isolating instruction (d1) further comprises:

(d1i) holding the server in a power-off state.

42. The computer readable medium of claim 40, wherein the isolating instruction (d1) further comprises:

(d1i) powering-down the server system.

43. The computer readable medium of claim 34, wherein the detecting instruction (c) is performed during a power-up sequence for the server system.

44. The computer readable medium of claim 34, wherein the detecting instruction (c) is performed if the server system senses that a new server has been placed into the system.

45. A system for interlocking a plurality of servers to a server system comprising:

an interlock mechanism for assigning an identifier to each of the plurality of servers, wherein the identifier uniquely identifies the server system and associates each of the plurality of servers to the server system, wherein a number of servers installed in the server system are autonomously checked to ensure that each of the number of installed servers is interlocked to the server system and to protect the server system from an unauthorized server, the interlock mechanism comprising a module of automated computing machinery, the automated computing machinery comprising an aggregation of computer hardware and software.

46. The system of claim 45, wherein each of the plurality of interlocked servers includes non-volatile storage.

47. The system of claim 46, wherein each of the plurality of interlocked servers comprises:

means for storing the identifier in each interlocked server's non-volatile storage.

48. The system of claim 47, wherein the interlock mechanism further comprises a utility for generating the identifier and a table for storing information related to each of the interlocked servers and their respective identifiers.

49. The system of claim 48 wherein the interlock mechanism further comprises:

means for detecting a server that is not interlocked to the server system, wherein a non-interlocked server is not authorized to run in the server system.

50. The system of claim 49, wherein the means for detecting further comprises means for examining the server's non-volatile storage and means for determining whether an existing identifier is valid if an identifier is found in the non-volatile storage, wherein the server is not interlocked if the existing identifier is invalid.

51. The system of claim 50, wherein the interlock mechanism further comprises:

means for protecting the server system from the non-interlocked server.

52. The system of claim 49, wherein the utility further comprises means for adding a server to the plurality of interlocked servers.

53. The system of claim 49, wherein the utility further comprises means for removing a server from the plurality of interlocked servers.

54. A computer server system comprising:

a plurality of servers;

a management module coupled to the plurality of servers; and an interlock mechanism coupled to the management module, wherein the interlock mechanism assigns to each of the plurality of servers an identifier that uniquely identifies the server system and associates each of the plurality of servers to the server system, wherein a number of servers installed in the server system are, at a time after the assignment of the identifier, autonomously checked to ensure that each of the number of installed servers is interlocked to the server system and to protect the server system from an unauthorized server.

55. The server system of claim 54 wherein each server comprises:
    means for storing the identifier in each server's non-volatile storage.

56. The server system of claim 54, wherein the interlock mechanism comprises a table, wherein the table stores information related to each of the interlocked servers and their associated identifiers.

57. The server system of claim 54, wherein the interlock mechanism further comprises means for detecting a server that is not interlocked to the server system.

58. The server system of claim 57, wherein the means for detecting further comprises means for examining the server's non-volatile storage and means for determining whether an existing identifier is valid if an identifier is found in the non-volatile storage, wherein the server is not interlocked if the existing identifier is invalid.

59. The server system of claim 57, wherein the interlock mechanism further comprises means for protecting the server system from the non-interlocked server.

60. The server system of claim 54, wherein the interlock mechanism further comprises a utility for adding a server to the plurality of interlocked servers.

61. The server system of claim 54, wherein the interlock mechanism further comprises a utility for removing a server from the plurality of interlocked servers.

62. The server system of claim 54, wherein the identifier is a nonce based on a serial number for the management module.

63. The server system of claim 62, wherein each server comprises:
    means for encrypting the nonce; and
    means for storing the encrypted nonce in each server's non-volatile storage.

64. The server system of claim 63, wherein the interlock mechanism further comprises means for examining the server's non-volatile storage and means for decrypting the encrypted nonce so that the interlock mechanism can determine whether the identifier is valid.

\* \* \* \* \*